Sept. 29, 1942.                J. S. MARTIN                2,296,860
                              PLANT INCUBATOR
                           Filed Aug. 16, 1940
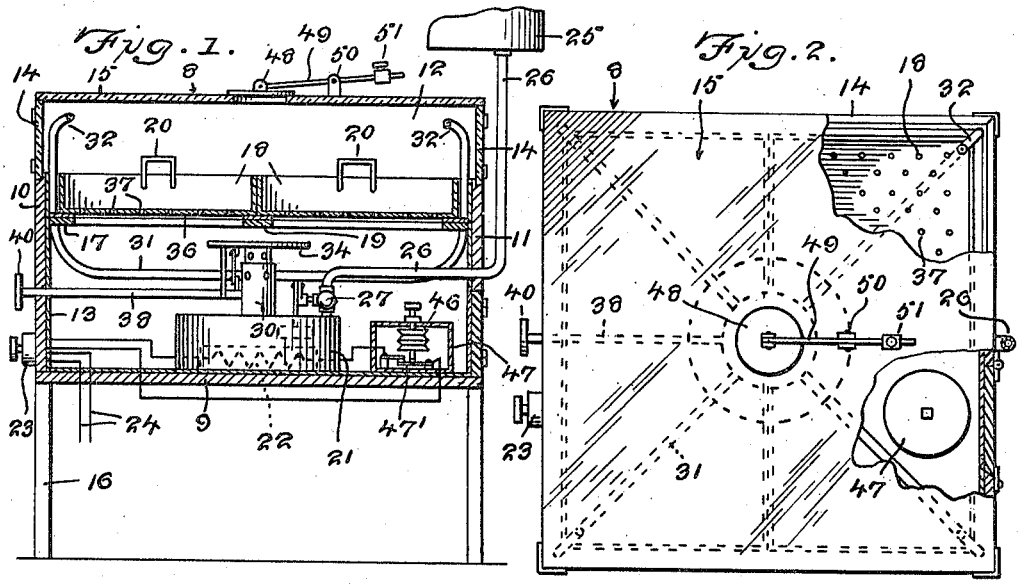
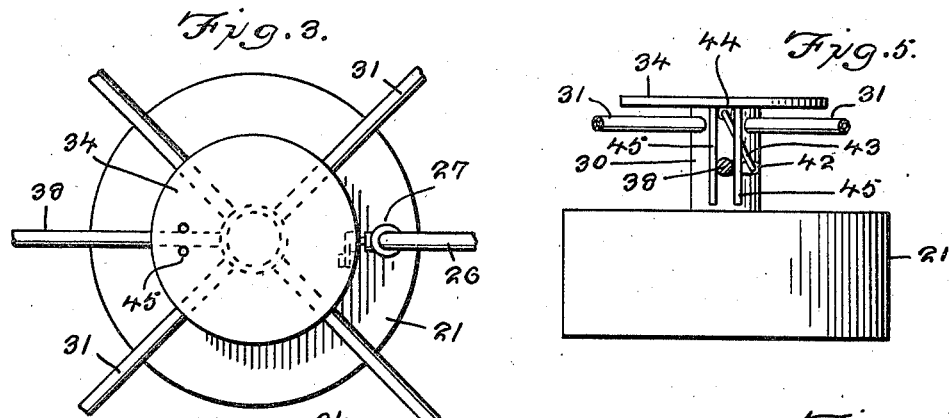
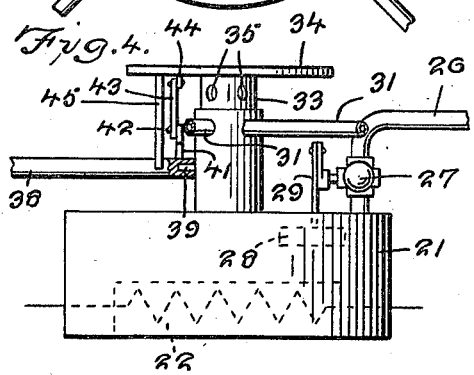
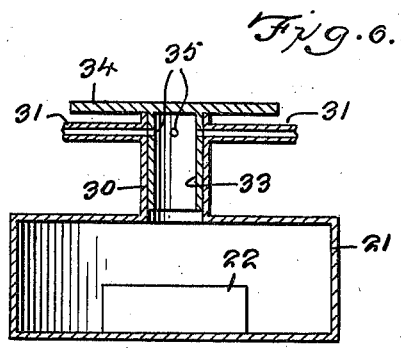
John S. Martin
INVENTOR
BY Victor J. Evans & Co.
ATTORNEYS Patented Sept. 29, 1942

2,296,860

UNITED STATES PATENT OFFICE 2,296,860

PLANT INCUBATOR

John S. Martin, Halfway, Oreg.

Application August 16, 1940, Serial No. 352,949

4 Claims. (Cl. 47—17)

The present invention relates to improvements in hotbeds for germinating the seeds of plants of all kinds.

An important object of the invention resides in the provision of means for supplying heated moisture and vapor both above and below the seed bed and for controlling the heated moisture so that it may be directed to the top and/or bottom thereof.

Another object of the invention is to provide a completely enclosed incubator-like structure, in which is removably supported a seed or plant bed which will derive full benefit from the moisture supplied to the top of the bed and from heat and a certain degree of the moisture applied to the bottom of the bed to rapidly germinate the growth of seeds of the most minute nature.

The invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a vertical sectional view of a hotbed embodying the features of the present invention.

Figure 2 is a top plan view thereof with parts in section and parts in elevation.

Figure 3 is a top plan view of the water heating and control device.

Figure 4 is a side elevational view thereof.

Figure 5 is a side elevational view of the water heating and control device as viewed from another side.

Figure 6 is a vertical sectional view of the water heating and control device.

Referring to the drawing for a more detailed description thereof, the improved hotbed or incubator comprises a substantially square-shaped casing which is generally designated in the several views by the numeral 8 having a bottom wall 9, side walls 10 and 11 and end walls 12. A certain area of the side and end walls is preferably formed of wood, metal or the like, the interior of which is provided with a suitable lining 13. The upper end of the side and end walls is formed of glass sheets 14 united by any desired means to said walls. A glass cover 15 is removably supported on the glass walls 14, the walls 14 and cover 15 rendering the interior of the device visible. The casing 8 is supported on legs or standards 16 attached to each corner of the casing.

An annular rim 17 extends inwardly of the side and end walls forming a support for the seed trays 18. It is to be understood that the interior of the casing may be formed so as to support one or a plurality of seed trays. It will be noted in Figure 1 of the drawing that a supporting member 19 extends transversely of the casing to provide a central support for the trays. Handles 20 are formed on the trays to facilitate placement and removal thereof from the casing.

Carried by the bottom wall and supported substantially centrally thereof is a substantially cylindrical-shaped container 21 for housing an electrical heating element 22, said heating element being controlled by means of a switch 23 mounted on the exterior of the casing 8 and connected to a battery or other source of supply through the wires 24. The container 21 receives a supply of water from a reservoir 25 through the pipe 26, the water to be heated to form steam and vapor to be supplied to the plant trays 18. A valve 27 is mounted in the supply pipe 26 adapted to be actuated by a float 28 through the lever mechanism 29 for controlling the supply of water to the container 21 from the reservoir 25.

A tube 30 is formed integral with and extends vertically of the container 21 through which the moisture and steam is discharged. A series of discharge pipes 31 are attached to the tube 30 and extend radially therefrom to each corner of the casing and said pipes are then bent upwardly and inwardly to a point above the trays 18 as best shown in Figure 1 of the drawing. This arrangement of pipes permits steam to be discharged through the ends 32 thereof against the cover 15 to be discharged downwardly on the trays. A tubular section 33 is slidably supported within the tube 30, the upper end of the section 33 being formed with a disc 34. A series of discharge openings 35 are formed in the section 33 through which moisture and vapor will be discharged against the disc 34 scattering the vapor and moisture to all parts of the casing and particularly against the bottom wall 36 of the trays 18 which are formed with a multiplicity of perforations 37.

A means has been provided for controlling movement of the section 33 within the tubular member 30 which means includes a rod 38 secured to the member 30 by means of the pin 39, said rod extending outwardly of the casing and formed with an actuating handle 40. An arm 41 extends vertically of the rod 38 and is attached as indicated at 42 to a second arm 43, the latter arm being connected to the disc 34 as indicated at 44. Pins 45 extend downwardly from the disc 34 on each side of the rod 38 for maintaining said rod in proper position as it is actuated to move the disc 34 upwardly or downwardly. When desiring to control the discharge of steam or vapor from the container 21 to the upper section of the casing 8, the handle 40 is grasped by the operator for rotating the rod 38 in the pin 39. As the rod is rotated the arm 41 will actuate the arm 43 to pull the disc 34 downwardly to the position shown in Figure 6 of the drawing. When in this position the openings 35 will register with the tubes 31 so that steam will only be discharged through the pipes 31 and out the discharge end 32 thereof. Reversing the rotation of the rod 38 will move the tubular sections 33 upwardly into the position shown in Figure 4 of the drawing so that steam will be exhausted through the openings 35 against the disk 34 and bottom of the trays 18. This position of the parts will effectively moisten the soil and plants within the trays 18 from the upper side thereof through the pipes 31, while the discharge of vapor through the openings 35 will penetrate and treat the soil through the perforations 37 in the bottom wall 36 of the trays 18. Thus it will be seen that a means has been provided for controlling the supply of steam and vapor to the top and/or bottom of the trays.

For preventing overheating of the water within the container 21 there is provided a bellows-type thermostat 46 mounted in the casing 47 on the bottom wall 9. Expansion and contraction of the thermostat 46 will make and break the switch elements 47 for completing and breaking the circuit to the electrical heating element 22 through the master switch 23. The thermostat 46 is controlled by the temperature within the casing 8.

In order to prevent injury to the plants within the trays 18 should the pressure of steam within the housing 8 become excessive, there is provided a vent plug 48 in the cover 15, said plug being attached to a lever 49 the intermediate portion of which is pivotally attached to a bracket 50. A weight 51 is slidable on the lever 49 which can be adjusted so that when the steam reaches a certain pressure the plug 48 will be raised to permit the escape of steam from the casing.

The trays 18 containing the soil and seeds will at all times be subjected to a proper temperature within the casing for effective seed germination. The supplying of moisture to the top and bottom of the tray will materially add to rapid propagating of the seeds. The casing 8 is relatively light in weight therefore rendering the device portable for use in the home as well as in greenhouses.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed is:

1. A device of the character described comprising a housing, a seed planting tray, means for supporting said tray in said housing, a container within said housing beneath said tray, means for supplying water to said container, heating means within said container for generating steam and vapor from said water, and means whereby said steam may be discharged above or below said trays.

2. A device of the character described comprising a housing, a seed planting tray, means for supporting said tray in said housing, a container within said housing beneath said tray, means for supplying water to said container, heating means within said container for generating steam and vapor from said water, means for controlling the discharge of steam above and below said tray, and means for controlling said discharge means.

3. A device of the character described comprising a housing, a seed planting tray, means for supporting said tray in said housing, a container beneath said tray, means for supplying water to said container, heating means within said container for generating steam and vapor from said water, a tube extending vertically from said container, a series of steam discharging pipes connected to said tube and extending above said tray, means within said tube for discharging steam below said tray, and means for controlling said discharge means.

4. A device of the character described comprising a housing, a seed planting tray, means for supporting said tray in said housing, a container beneath said tray, means for supplying water to said container, heating means within said container for generating steam and vapor from said water, a tube extending vertically from said container, a series of steam discharging pipes connected to said tube and extending above said tray, a tubular section slidably held within said tube, a disc mounted in the upper end of said tubular section, said tubular section being formed with a plurality of perforations beneath said disc through which steam is discharged against said disc, and means for actuating said slidable section to control the discharge of steam therefrom.

JOHN S. MARTIN.